S. A. TOW.
PEA HULLER.
APPLICATION FILED JULY 25, 1918.

1,359,450.

Patented Nov. 16, 1920.
2 SHEETS—SHEET 1.

Inventor
S. A. Tow,

By G. Hume Talbert
Attorney

S. A. TOW.
PEA HULLER.
APPLICATION FILED JULY 25, 1918.

1,359,450.

Patented Nov. 16, 1920.
2 SHEETS—SHEET 2.

Inventor
S. A. TOW,

By
Attorney

UNITED STATES PATENT OFFICE.

SAMUEL A. TOW, OF WALHALLA, SOUTH CAROLINA.

PEA-HULLER.

1,359,450. Specification of Letters Patent. Patented Nov. 16, 1920.

Application filed July 25, 1918. Serial No. 246,709.

*To all whom it may concern:*

Be it known that I, SAMUEL A. TOW, a citizen of the United States, residing at Walhalla, in the county of Oconee and State of South Carolina, have invented new and useful Improvements in Pea-Hullers, of which the following is a specification.

The object of the invention is to provide a threshing machine especially designed as a pea huller wherein a minimum of attention is required on the part of the operator and wherein increased efficiency in the separation of the peas from the hulls and vines may be secured with the least possible tendency to breaking or crushing the peas, and in that connection to provide a mechanism having an increased capacity with the parts so arranged as to facilitate the use in combination therewith of measuring and sacking devices for the product.

Further objects and advantages will appear in the course of the following description, it being understood that changes in form, proportions and details of construction may be resorted to within the scope of the appended claims without departing from the spirit of the invention.

In the drawing:—

Figure 1:
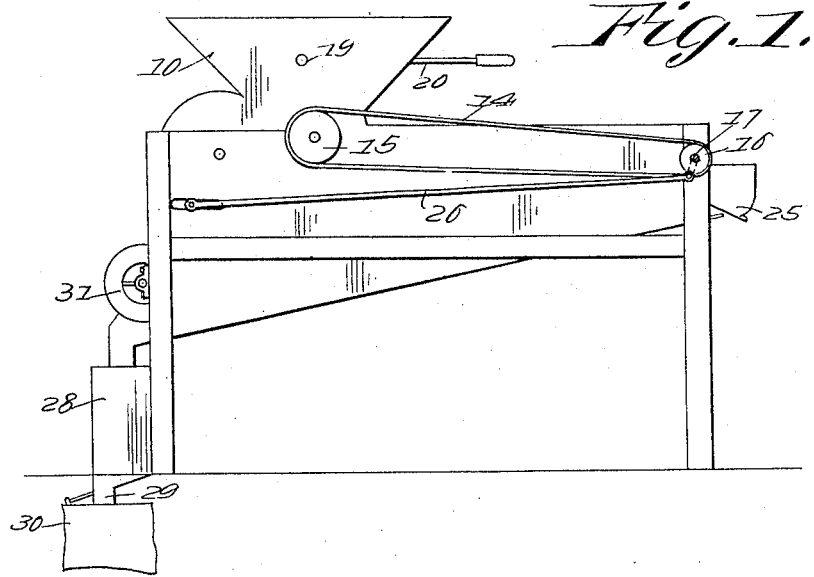
Figure 1 is a side view of a pea hulling mechanism constructed in accordance with the invention and showing the preferred embodiment thereof.
Figure 2:
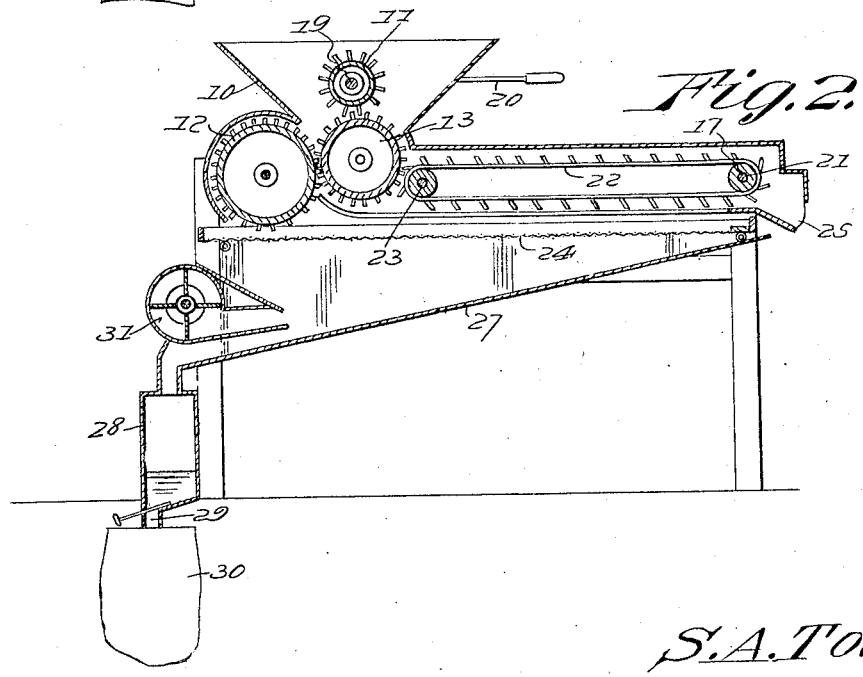
Fig. 2 is a longitudinal sectional view of the same.
Figure 4:
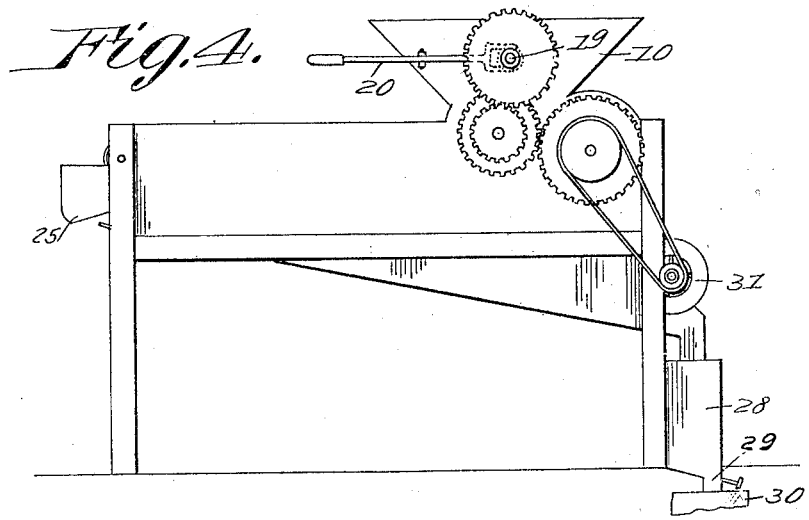
Fig. 4 is a side elevational view the opposite of Fig. 1.
Figure 3:
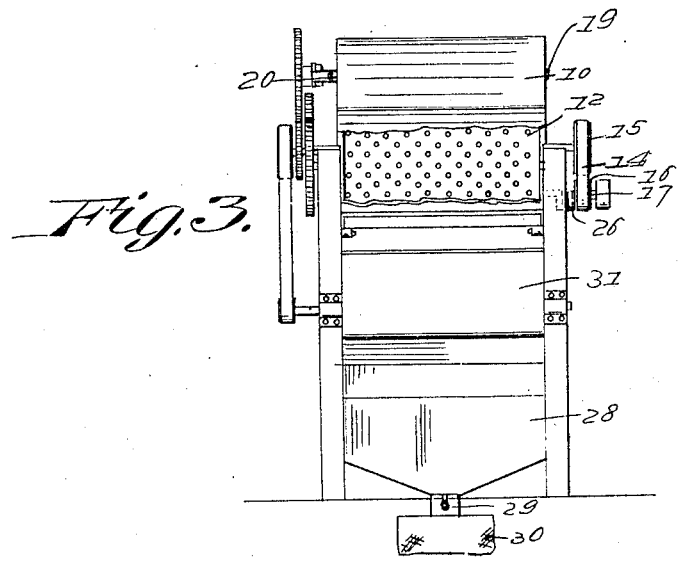
Fig. 3 is an end view partly in section.

The pea hulls and vines are fed to the machine by way of a hopper 10 within which is arranged a suitable spurred feed roll 11 which serves to deliver the material to coöperating revoluble cylinders 12 and 13, which are geared together for simultaneous movement and are driven by a belt 14, which connects a pulley 15 on one of said cylinders with a pulley 16 on a transverse shaft 17 receiving power from any suitable source, not shown. The feed roll is geared as shown in Fig. 4 to the shaft of one of the cylinders and has its shaft 19 mounted in bearings on a lever 20, by means of which disengagement of the feed roll may be effected, interrupt the rotation thereof, and thus avoid the choking of the machine by overfeeding.

Carried by a roll 21 on the shaft 17 is an endless hull rake 22 consisting of a belt extending around an idle or guide roll 23 and traversing a shaker screen 24 upon which the hulled peas and hulls are deposited by the cylinders, the function of said raker belt being to move the hulls and vines toward the rear end of the machine where they are distributed by way of a spout 25. The screen is operated for example from the shaft 17 through a pitman 26 or the equivalent thereof and by reason of the vibration thereof assisted by the action of the raker belt the peas are separated from the hulls and vines and are permitted to pass down through the meshes of the screen to a receiving conveyer 27 from which they pass to a receptacle 28, which in the construction illustrated consists of a measuring device having an outlet 29, which may be fitted with a suitable gate to be opened when the measure is full or has received a predetermined quantity of the hulled peas in order that the latter may be deposited in a sack 30 suspended from the spout of the measure.

In order that the fine dust and particles of hulls and vines, leaves and so forth which may pass through the shaker screen may be removed from the product prior to the deposit thereof in the receptacle provided for that purpose, there is employed a blast fan 31 disposed to discharge lengthwise of the conveyer 26 or in opposition to the movement of the peas therethrough, so that such waste or objectionable matter may be discharged with the other tailings at or near the spout 25, and owing to the fact that this blast is discharged through the column of peas as they fall from the shaker screen to the conveyer, and in opposition to the direction of movement of the peas toward the receptacle, a thorough separation is effected without involving the risk of driving any of the peas out through the rear end of the machine with the tailings or refuse. It will be noted moreover that the operation of the raker belt serves to turn and agitate the hulls and vines so as to permit the peas to separate therefrom and reach the plane of the shaker screen, whereby they are effectively separated and dropped upon the conveyer. The operation of this belt serves to avoid the choking of the mechanism by reason of accumulation of vines and hulls as they leave the hulling cylinders, and thus permit of a continuous and uniform operation of the machine under conditions which insure a thorough separation.

A further advantage of the mechanism described is in the fact that by using a plurality of coöperating hulling cylinders the speed of rotation of the latter may be timed so slowly as to avoid the forcible ejection of the peas from the hulls or the violent tearing of the latter and hence the breaking or crushing of the peas which ordinarily results when a single hulling cylinder is depended upon to perform this function, and yet by reason of the facility with which the material passes between the cylinders and the thoroughness with which the peas are removed from the hulls, it is possible to effect a continuous and rapid operation of the separation under the most favorable conditions.

What is claimed is:—

1. A pea huller having hulling cylinders, a feed roll actuated in timed relation to the cylinders, a pea separating screen, an endless hull and vine rake traversing the screen and operated in timed relation to the cylinders, and means for interrupting the operation of the feed roll.

2. A pea huller having hulling cylinders, a feed roll actuated in timed relation to the cylinders, a pea separating screen having a mesh adapted to permit of the passage of the peas therethrough, an endless hull and vine rake traversing the screen and operated in timed relation to the cylinders, and means under manual control for interrupting the operation of the feed roll.

3. A pea huller having hulling cylinders, a feed roll actuated in timed relation to the cylinders, a pea separating screen having a mesh adapted to permit of the passage of the peas therethrough, an endless hull and vine rake traversing the screen and operated in timed relation to the cylinders, and means under manual control for interrupting the operation of the feed roll without modifying the operation of the rake, to avoid the overcharging of the latter.

4. A pea huller having hulling cylinders, a feed roll actuated in timed relation to the cylinders, a pea separating screen having a mesh adapted to permit of the passage of the peas therethrough, an endless hull and vine rake traversing the screen and operated in timed relation to the cylinders, and means under manual control for interrupting the operation of the feed roll without modifying the operation of the rake, to avoid the overcharging of the latter, in combination with a conveyer disposed beneath and in inclined relation to the screen and means for providing an air blast in opposition to the progress of peas upon said conveyer and in intersecting relation to the path of the peas in flowing from the screen to the conveyer.

In testimony whereof I affix my signature.

SAMUEL A. TOW.